United States Patent [19]

Lewis et al.

[11] Patent Number: 5,230,540
[45] Date of Patent: Jul. 27, 1993

[54] FLUID-TIGHT JOINT WITH INCLINED FLANGE FACE

[75] Inventors: Leo V. Lewis, Leicester; Thomas H. Hyde; Heinrich Fessler, both of Nottingham; Barry J. Marsden, Cheshire, all of England

[73] Assignee: Rolls-Royce plc, London, England

[21] Appl. No.: 768,427

[22] PCT Filed: Mar. 13, 1990

[86] PCT No.: PCT/GB90/00377
§ 371 Date: Sep. 13, 1991
§ 102(e) Date: Sep. 13, 1991

[87] PCT Pub. No.: WO90/10812
PCT Pub. Date: Sep. 20, 1990

[30] Foreign Application Priority Data

Mar. 15, 1989 [GB] United Kingdom ................. 8905894

[51] Int. Cl.$^5$ ................................. F16L 23/032
[52] U.S. Cl. ................................. 285/363; 285/405; 285/412; 285/368
[58] Field of Search ............. 285/363, 414, 405, 408, 285/416, 406, 368, 412

[56] References Cited

U.S. PATENT DOCUMENTS

| | | | |
|---|---|---|---|
| 2,202,492 | 5/1940 | Jalocks | 285/412 |
| 2,412,487 | 12/1946 | Amley et al. | |
| 2,473,102 | 6/1949 | Krooss | |
| 2,543,963 | 3/1951 | Gaffin | |
| 2,616,946 | 11/1952 | Scheer | |
| 2,739,828 | 3/1956 | Schindler et al. | |
| 2,745,683 | 4/1968 | Nihlen | |
| 2,937,893 | 5/1960 | Hill et al. | 285/408 |
| 2,940,779 | 6/1960 | Buono | 285/363 |
| 3,135,538 | 6/1964 | George | |
| 3,158,380 | 11/1964 | Carrell et al. | 285/363 |
| 3,214,201 | 10/1965 | Fonda | 285/363 |
| 4,074,914 | 2/1978 | Novotny | 285/405 |
| 4,105,227 | 8/1978 | Ekberg et al. | 285/416 |
| 4,183,562 | 1/1980 | Watkins et al. | 285/405 |
| 4,640,530 | 2/1987 | Abbes et al. | |
| 4,919,391 | 4/1990 | Kemp | 285/414 |

FOREIGN PATENT DOCUMENTS

| | | | |
|---|---|---|---|
| 766659 | 9/1967 | Canada | 285/363 |
| 1024183 | 3/1953 | France | |
| 93388 | 2/1959 | Norway | 285/368 |
| 87/05978 | 10/1987 | PCT Int'l Appl. | |
| 163168 | 5/1958 | Sweden | 285/363 |
| 403932 | 8/1932 | United Kingdom | |
| 1210291 | 10/1970 | United Kingdom | 285/405 |
| 2200179 | 7/1988 | United Kingdom | |

Primary Examiner—Eric K. Nicholson
Attorney, Agent, or Firm—Oliff & Berridge

[57] ABSTRACT

A special type of flange ring (201) for making bolted flanged joints between axially consecutive component parts of hollow fabrications, such as gas turbine aero engine casings (210). Each flange joint face (206) has, at its radially inner circumference, a radially extending sealing land or flat (216), the remainder of the flange joint face comprising, when in the unstressed condition, a frustoconical surface (209) inclined at a small angle (c°) to the radial plane (207) of the sealing flat (216). The frustoconical surface (209) is drawn into contact with a complementary joint surface (208) when the bolts (204) are tightened. The flange rear face (212) is parallel to the frustoconical surface (209). This configuration creates a joint having a large line reaction force along the sealing land (216), thereby providing efficient sealing against internal pressure even when tension forces in the casing (210) are present. Alternative embodiments are described.

22 Claims, 6 Drawing Sheets $B_0 = 0 \quad R_0 = 0$ $B_0 < B^{CL} \quad R_0 = NB_0$ $B_0 = B^{CL} \quad R_0 = NB^{CL}$ $B_0 = B_0^R \quad R_0 = NB^{CL} + ?$

FLUID-TIGHT JOINT WITH INCLINED FLANGE FACE

The present invention relates to fluid-tight bolted joints between axially consecutive component parts of hollow fabrications such as turbomachine casings or lengths of ducting.

It is a frequent industrial requirement that consecutive component sections of generally cylindrical fabrications such as casings, ducts, or pipes be joined together in a fluid-tight manner; for example, in the construction of turbomachines such as gas turbine engines, in which structural casings are required to surround the rotating parts and provide a boundary for the fluid-flow passages. One of the most widely used means of obtaining a joint between axially consecutive component sections of pipes, etc., is to provide their ends with flange rings which are bolted together face-to-face to define a suitably sealed joint. The flange rings usually project outwards from the body of the fabrication.

General industrial practice for ensuring that bolted flanged joints are fluid-tight is to utilise separate sealing elements between the confronting flange faces of the joints, such as gaskets, 'O'-rings or jointing compounds. However, such measures are not utilised in connection with the casings of gas turbine aero-engines because of various factors, such as sealing element material life, or adverse effects on assembly tolerances and maintainability.

Consequently, general aero engine practice for joining together successive sections of casing has been to provide metal-to-metal joints between flanges whose joint faces are machined square to the longitudinal axis of the casing. However, such joints can be difficult to render fluid-tight.

A design stratagem used for such bolted flanged joints in pressure vessel walls, as opposed to aero engines, is to provide the joint faces of abutting flange rings with small annular sealing lands at their inner diameters. In this way better sealing against fluid egress is achieved because the bolt closure loads in the joints are concentrated on the small areas of the sealing lands instead of over the whole extent of the flange faces. Whilst this is satisfactory if the flanges are thick, and hence very stiff, it is unsatisfactory for the less robust lightweight flanges used for aero engine casings because it introduces bending stresses in the bolts due to distortion of the flanges when the bolts are fully tightened.

A specific object of the present invention is to provide improved metal-to-metal sealing of lightweight bolted flanged joints for casings of aeroengines and other turbomachines.

A more general object is to provide flanged joints which do not require separate sealing elements to render the joints fluid-tight.

A further object is to provide lightweight bolted flanged joints in which the bolt closure loads can be concentrated on relatively small sealing areas of the joint faces whilst avoiding excessive bending stresses in the bolts.

Accordingly, the present invention provides a flange ring for a fluid-tight annular joint between axially consecutive component parts of a hollow fabrication, the flange ring having:
(a) a flange joint face;
(b) a flange rear face;
(c) a hub portion for joining the flange ring to one of the component parts of the hollow fabrication, the hub portion having a wall thickness which reduces from a maximum adjacent the flange rear face to a minimum which is substantially equal to the wall thickness of the component part; and
(d) a plurality of equally spaced-apart location features for the location of fastening means whereby the flange joint face can be drawn into sealing engagement with a confronting complementary joint face to form the fluid-tight annular joint;

wherein the flange joint face in the as-manufactured unstressed condition has a relatively narrow radially disposed sealing flat, the remainder of the flange joint face comprising a frustoconical surface inclined at an angle of $c°$ to the radial direction and meeting the sealing flat at a corner with an included angle of $180°-c°$, the width and position of the sealing flat on the flange joint face being such that manufacturing tolerances of the fabrication do not prevent sealing engagement with the complementary joint face and that axial loads in the joint do not cause unacceptable bending or buckling in the assembled fabrication, the flange rear face being parallel to the frustoconical surface and the stiffness of the flange ring being such as to allow at least the sealing flat and preferably also the frustoconical surface to be drawn into contact with the complementary joint face by the fastening means with a force sufficient to generate a line reaction at the sealing flat sufficient to seal against a predetermined fluid pressure without overstraining the fastening means.

For convenience, such a flange ring will hereafter be called a "conical flange ring".

The width of the sealing flat is preferably at least partly coextensive with the wall thickness of the hub portion and should be not greater than about three quarters of the minimum wall thickness of the hub portion. The preferred width of the sealing flat is approximately one-half of the minimum wall thickness of the hub portion.

Conical flange rings may be either outwardly projecting, to form an external joint, or inwardly projecting, to form an internal joint. In the former case the sealing flat is preferably at the radially inner circumference of the flange joint face, but in the latter case the sealing flat is preferably at the radially outer circumference of the flange joint face. For outwardly projecting conical flange rings the hub portion may have either a cylindrical or a frustoconical bore, while for inwardly projecting conical flange rings the hub portion may have either a cylindrical or a frustoconical external surface.

Conveniently, the fastening means are bolts and the angularly spaced-apart location features are clearance holes for the bolts.

We prefer the wall thickness of the hub portion to reduce from its maximum to its minimum value without any stepwise transitions. This may be accomplished by means of either a straight-line taper or a shallowly concave taper, the latter being preferred for flanges of small diameter.

Angle $c°$ may be in the range of up to about 8°, but a range of about 1° to 6° inclusive is preferred.

The invention includes an annular joint for joining axially consecutive component parts of a hollow fabrication, one or both sides of the joint comprising a conical flange ring.

The invention also includes such a joint in which spacer ring means are interposed between the conical flange ring and the other side of the joint.

The invention also embraces structural casings for turbomachines, the structural casings being provided with flange rings in accordance with the invention.

An exemplary embodiment of the invention will now be described with reference to the accompanying drawings, in which.

Figure 1:
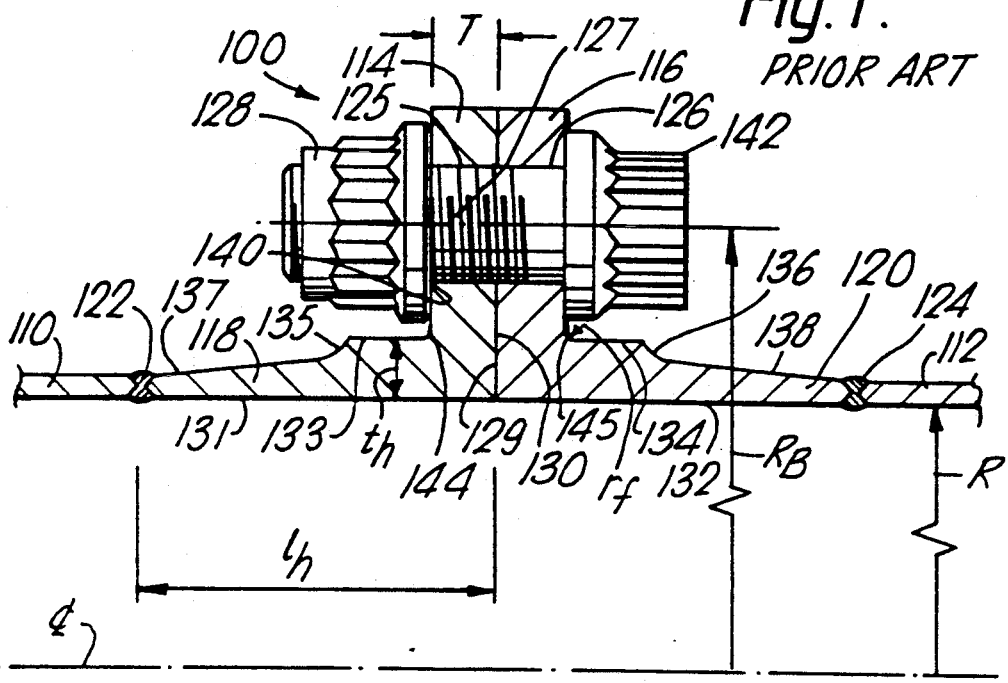
FIG. 1 shows a sectional side elevation of part of a typical conventional bolted flange ring joint between two axially successive sections of an aero engine casing.

FIG. 1 shows a typical known type of bolted annular joint 100 between two axially consecutive cylindrical casing sections 110, 112 of internal radius R in an aero engine having an axial centreline C, each casing section having an end flange ring 114, 116 extending radially outwards, the flange rings being joined to the casings through respective integrally formed hub portions 118, 120 by means of welds at 122, 124.

The flange rings 114, 116 are provided with a number of angularly spaced clearance holes 125, 126 for bolts 127 whereby the two flange rings can be drawn together by the tightening up of nuts 128 on the bolts to form the bolted joint. The holes 125, 126 are of course arranged on a bolting pitch circle of radius $R_B$ and are equally spaced around the circle's circumference, apart from at one position where a so-called "balking feature" is provided to ensure that the axially consecutive casing sections can only be bolted together in one correct angular orientation with respect to each other. The balking feature in the present instance is that one of the bolt holes 125,126 in each flange is offset from the equispaced position by an amount which makes it impossible to pass the bolts 127 through all the holes 125,126 unless the offset holes are aligned with each other.

The joint faces 129, 130 of the two flange rings 114, 116 extend radially, being machined square to the axis C and to the internal cylindrical bore surfaces 131, 132 of the hub portions.

Each hub portion 118, 120 has a land 133, 134 on its outer surface near the flange rings 114, 116, where the hub is of maximum constant thickness $t_h$, followed by a stepwise transition 135, 136 down to a frustoconical surface 137, 138 which tapers the thickness of the hub portions down to that of the casing sections 110, 112.

There are two basic objectives to be satisfied when designing a joint like that above. They are:

i) sealing against internal pressure (compressed air or turbine gases)

ii) transmission of axial load from one casing section to the other.

These two objectives have to be achieved while the stresses, in the bolts and in the flanges, are kept within safe limits. Potential structural failure arises from both the single loading case and from low cycle fatigue, the latter being caused by fluctuating loadings during the operating cycle of the aero engine.

The critical stress location on the bolt is on the first loaded thread, on the radially innermost side of the bolt 127 at point 140 when it is located in the clearance hole 125 (because of the high tensile cyclic stress that can be generated there). The critical stress location on the flange is either directly under the bolt head 142 or in the flange fillets 144, 145.

The designer limits the assembly stresses in the bolt and the flange by quoting a torque limit for the bolts. The cyclic stresses in the bolts can be limited by having a sufficient number of bolts. This is often thought of in terms of an upper limit to the ratio $A/NB$ (where A is the axial load to be transmitted at peak loading, N is the number of bolts and B is the individual bolt force). The $A/NB$ ratio only bears indirect relation to the quantity of real concern in this case, i.e. the cyclic stress on the bolt, but long experience with values in the region of 33% seems to have given little trouble with bolt fatigue in gas turbine aero engines. Finally, the cyclic stresses in the flange can be limited by judicious choice of the profile's dimensions, i.e. flange thickness T, hub thickness $t_h$, flange fillet radius $r_f$ and hub length $l_h$.

Prediction of the cyclic stresses in such a joint is far from simple, because contact conditions change with load. Considerable time has, therefore, been spent over the years in the development of calculation procedures. On the other hand, as evidenced by the lack of published research on the topic, very little time has been devoted to the sealing considerations in joint design for gas turbine engine casings.

It is well known that sealing of the existing type of joint can be achieved if adjacent bolts are sufficiently close to each other. Meck (Meck, H.R., "Analysis of Bolt Spacing for Flange Sealing", Trans. ASME, Jnl. of Engineering for Industry, February 1969, pp 290-2) derived by analytical means an expression which related bolt size and flange thickness to the maximum pitching of the bolts which still guaranteed sealing. Unfortunately, the small bolt sizes, thin flanges, and large diameters found throughout aero engine practice lead to impracticably large numbers of bolts. It can be shown for instance that Meck's formula requires 168 6.35 mm bolts in a 0.75 m diameter flange. Normal practice then is to use bolt-to-bolt pitches of the order of 3 to 5 cm in high pressure joints (and even larger pitches on low pressure joints). In this way joints are introduced which cannot be guaranteed to seal, i.e. be fluid-tight, at all engine conditions. This is because only the areas of the joint faces immediately surrounding the bolts are urged into contact with each other.

The present invention utilises an alternative way of achieving a fluid-tight seal against internal pressure in annular bolted flange ring joints.

Figure 2A:
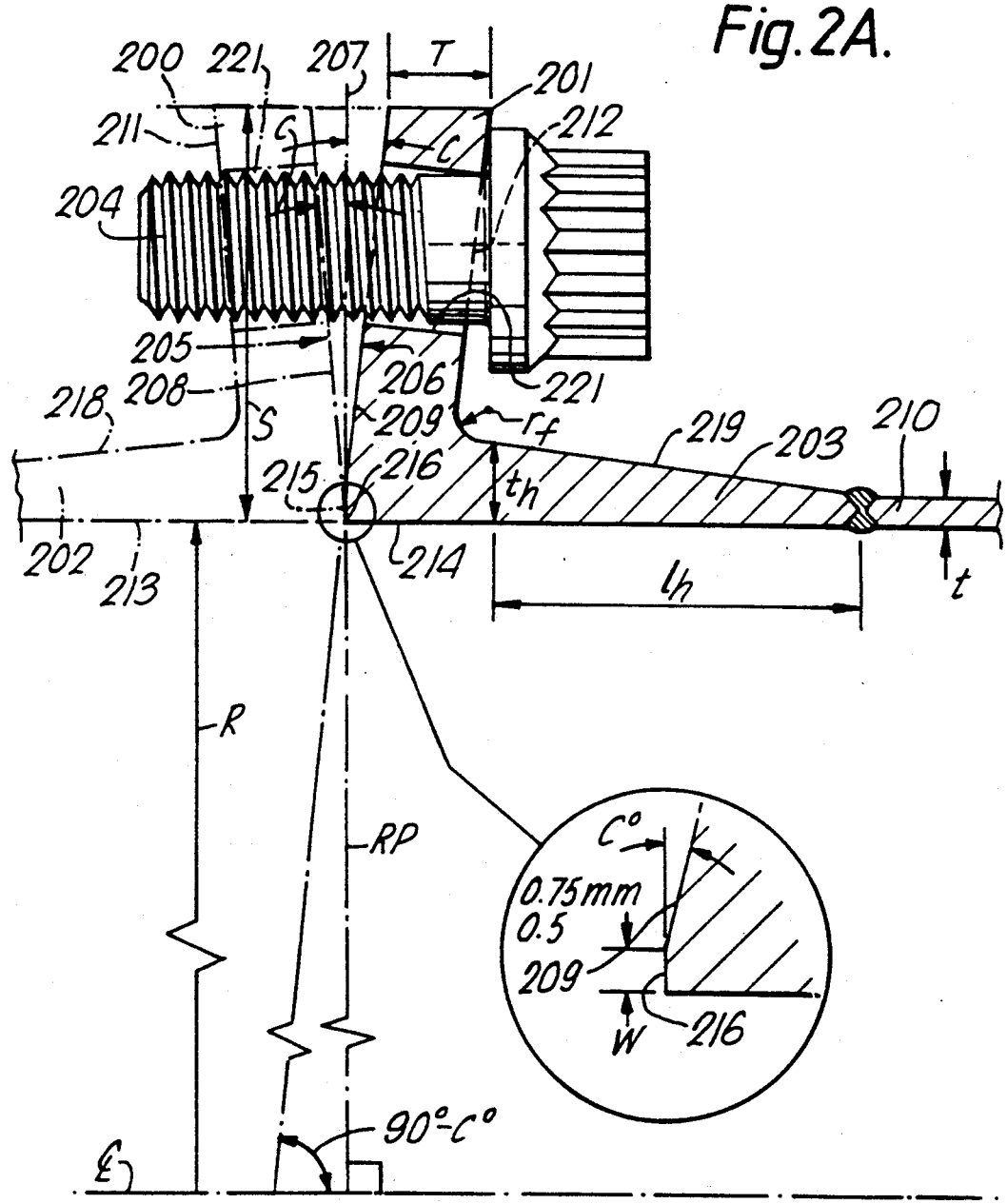
FIGS. 2A and 2B show sectional side elevations of flange rings in accordance with the present invention.

FIG. 2A shows in full lines a flange ring forming the right-hand half of one version of a bolted flanged joint designed in accordance with the invention. The left hand half is shown in broken lines, and is a mirror image of the right-hand half. The flange rings 200, 201 and the hub portions 202, 203 are shown in the unstressed or "as manufactured" condition, in which the bolts 204 with their nuts (not shown) have not yet begun to be tightened to draw together the two joint faces 205, 206. However, when the bolts are fully tightened to a predetermined torque, the joint faces 205, 206 will meet at a common contact surface 207, which in this case is in a radial plane RP.

The bolts pass through clearance holes 221 provided in the flange rings, these holes being equally spaced around a bolting pitch circle except for a balking feature as already described in relation to FIG. 1.

It will immediately be apparent that the joint faces 205, 206 of the flange rings 200, 201 each have a major part 208, 209 which, instead of being machined square to the casing centre line CL and the internal bore surfaces 213, 214 of their hub portions 202, 203 and the cylindrical casing 210, as in the prior art, have been machined at a small cone angle, c. Angle c is measured as a deviation from the radial plane RP, being in the range of up to about 8°, preferably 1° to 6° inclusive, so that the joint face portions 208, 209 each form a frustum of a cone which shares its axis of symmetry CL with that of the flange and casing and whose apex included angle is 180°−2c. Likewise, the back faces 211, 212 of the flange rings 200, 201 are formed at the same cone angle c, so that they are parallel with the surfaces 208, 209, except of course at their fillet radii $r_f$ with the hub portions 202, 203.

For the purpose of the subsequent description, such flange rings will be called conical flange rings.

A further noteworthy feature of the invention is that a minor part of each joint face 205, 206 is machined without a cone angle—i.e. square to the respective internal cylindrical bore surfaces 213, 214 of the hub portions 202, 203—so that it forms a narrow radially disposed circular sealing flat or land 215, 216 at the radially inner circumference of each joint face 205, 206. No matter what the configuration of the other parts of a conical flange, its sealing flat must always lie in a radial plane in the unstressed condition. Theoretically, the sealing flats 215, 216 are not necessary, but in practice they are required in order to allow for out-of-roundness and eccentricity of the flanges forming the joints between the sections of casing.

More specifically, the width w of the flats 215, 216 should preferably be in the range from one quarter to three quarters of the thickness t of the casing 210, a preferred value being approximately half the thickness t. The logic behind selection of width w is that the minimum allowable value is that which is adequate to cope with any expected out-of-roundness of the bore surfaces 213, 214 and with any expected lack of concentricity of casings; i.e. manufacturing tolerances must be allowed for. On the other hand, the maximum allowable value of w—and also the radial position of the middle of the flat on the joint face—is decided with reference to the allowable offset of axial load in the casing and the position of the centerline of the reaction between the abutting lands; i.e. the axial loads in the flanges should not be reacted at a radius greater than that of the outer surface of the casing 210. It will be evident to the average specialist, however, that the radial position of the flat and its width w can be varied outside these limits in situations where axial loads are not such as to cause concern in respect of bending or buckling of the casings.

Thirdly, it should be noted that the hub portions 202, 203 which, as for the flanges of FIG. 1, are formed integrally with the flange rings 200, 201, taper from their maximum thickness $t_h$ to the thickness t of the casing section 210, without a step. As shown in FIG. 2A, the whole of the outer surfaces 218, 219 of the hub portions 202, 203 have a linear taper giving a frusto-conical shape apart from the blending fillet radius $r_f$. This is preferred on the ground of simplicity for conical flanges of large diameter, such as used for aeroengine casings, but for flanges of small diameter a shallowly concave taper would be preferable on the ground of minimising stress levels in the component. A stepless taper, though desirable to facilitate proper flexing of the hub portions as the joint faces are brought into full contact with each other, is nevertheless not absolutely essential to the invention, and other types of hub profile, such as the radius-stepped hub profile shown in FIG. 1, could be utilised instead.

The fact that each of the surfaces 208, 209 of the joint faces 205, 206 is a frustum of a cone causes radical changes from conventional aero engine practice, both in the way in which the joint is sealed and in its structural response to loading.

For instance, when the bolts 204 are tightened and the joint faces brought together, bolt load generates a high intensity line reaction at the sealing flats 215, 216 and causes noticeable deflection of the flange rings. The line reaction results in fluid-tight or substantially fluid-tight sealing at the inside diameter. Furthermore, cyclic stresses, caused by fluctuations in axial loads in the casing during operation of the engine, can be virtually eliminated because the major reaction force at the lands 215, 216 is in line with the axial load.

Of course, there will be bending stress in the bolt 204 during assembly. However, when the joint has been fully tightened so that the joint faces 205, 206 are pulled flat against each other in radial plane RP, the bolts will essentially be in a state of uniform tension.

In connection with the type of bolts and nuts useable in the invention, it should be noted that the bolts and nuts illustrated herein all have flat circular bases for contact with the flanges. Hexagon headed bolts as normally utilised for pressure vessel joints outside the aerospace industry are not suitable because of interference between the corners of the nuts and bolt heads and the rear faces of the flange rings during tightening.

Figure 2B:
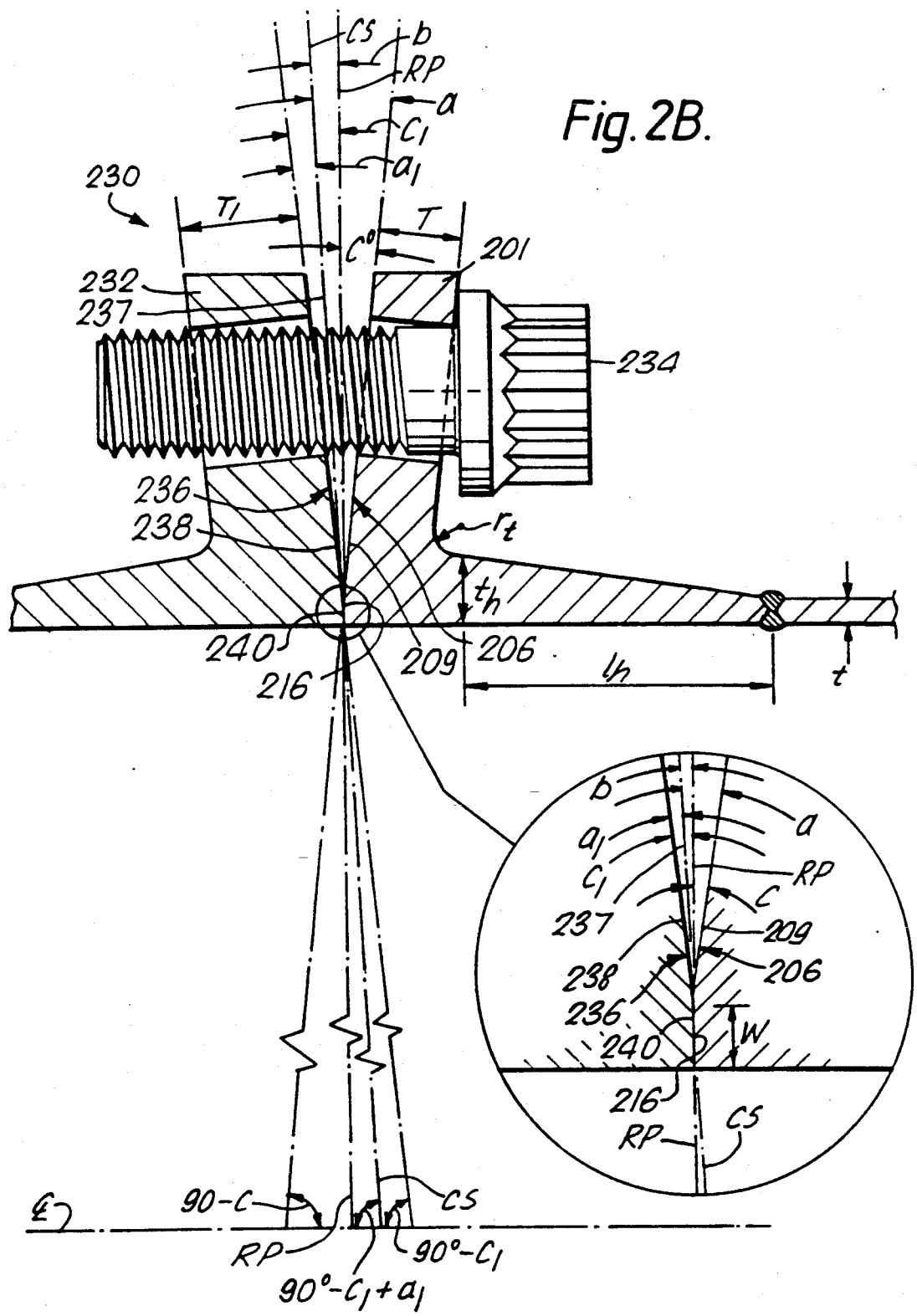

Looking now at FIG. 2B, both the right-hand and left-hand halves of a bolted flanged joint 230 are shown in full lines. The right-hand half of joint 230 comprises a flange ring 201 identical to the flange ring 201 of FIG. 2A, its features being identically referenced. the left-hand half of joint 230 comprises a flange ring 232 having a thickness $T_1$ appreciably thicker than thickness T of flange ring 201, this rendering flange ring 232 substantially stiffer than flange ring 201. It also has a joint face 236 whose major part 238 has a cone angel $C_1$, measured relative to radial plane RP, which is slightly smaller than cone angle c of flange ring 201, the cone's apex angle being 180°−2c. As in FIG. 2A, the flanges are shown in their as-manufactured unstressed condition and the bolts 234 and nuts (not shown) must be fully tightened to a predetermined torque in order for the major parts 209, 238 of joint faces 206, 236 to meet at a common joint contact surface 237. Because of its greater stiffness, flange ring 232 is only deflected through an angle $a_1$ when the nuts and bolts are fully tightened, but the less stiff flange ring 201 is deflected through a greater angle a, so that the joint contact surface 237 is not in the radial plane RP but included in a conical surface CS which makes an angle b ($=c_1-a_1$) with the radial plane RP.

As necessary to allow for misalignment, it can be seen from the inset of FIG. 2B that the joint face 236 of flange ring 232 is provided with a radial flat 240 which is of the same width w as the complementary flat 216 on the other joint face 206.

Figure 3:
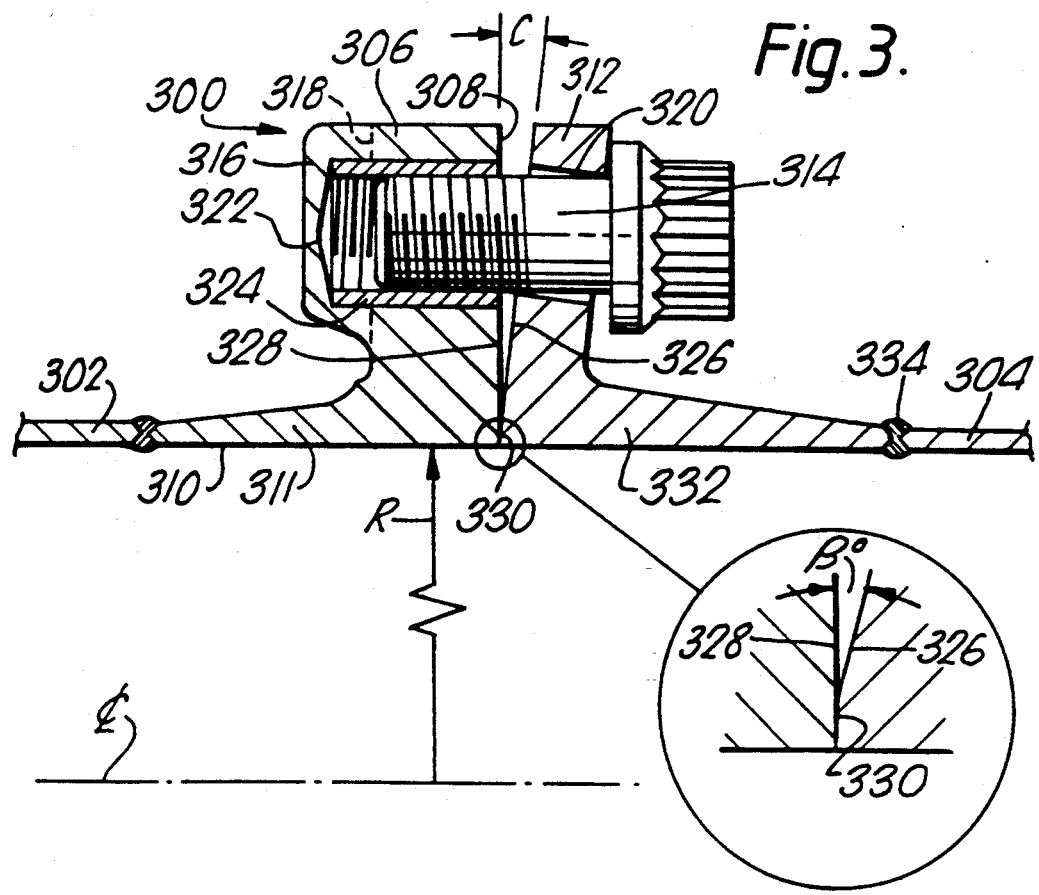
FIG. 3 shows a sectional side elevation of part of a bolted flange ring joint employing a single flange ring like that of FIG. 2A.

Moving on to a consideration of FIG. 3, there is shown an alternative embodiment in which a joint 300 between two axially consecutive sections of casing 302, 304 comprises on the one hand a thick, very stiff "flat" flange ring 306 joined to casing section 302 and having a joint face 308 which is square to the bore 310 of its hub 311 and to the centerline, and on the other hand a conical flange ring 312 in accordance with the invention, having a cone angle c° in the range of about 1° to 8° inclusive.

It will be noticed that although nuts and bolts could be utilised as in FIG. 2, the bolts 314 in FIG. 3 are in this instance not provided with nuts; instead, the thick flange ring 306 is provided with angularly spaced bosses 316 on its rear face 318. Clearnace holes 320 are drilled at the appropriate angle through conical flange ring 312 and blind holes 322 are drilled through the flange ring 306 into the bosses 316 and provided with suitable threaded inserts 324. The bolt 314 is shown at the stage in the tightening process when its circular base just contacts the rear face of the conical flange ring 312, before the conical joint face 326 has begun to be drawn towards the plane joint face 328. Once again, effective sealing of the joint is promoted by the provision of a radially narrow sealing flat or land 330 at the radially inner circumference of the conical joint face 326.

As before, the conical flange ring 312 is provided with an integral frusto-conical hub portion 332 which is joined to the casing section 304 by welds 334. However, the thick flat flange ring 306 is provided with a hub portion 311 which is similar to those shown in FIG. 1.

It should be noted that for lightweight constructions utilising a bolted flange joint comprising a "flat" flange ring confronting a "conical" flange ring, there is no need for the flat flange ring to be thick and stiff. A lighter weight construction could, for example, utilise an ordinary prior art flat flange ring 114 as shown in FIG. 1 for one side of the joint, the other side being a conical flange ring 312 as shown in FIG. 3. When the nuts and bolts are tightened up to the full rated torque, the joint faces of the flanges will meet in a conical contact surface whose cone angle will be intermediate between the radial plane of the flat flange and the cone angle of the conical flange.

A production engineering advantage can be made to accrue from the form of conical flange joint construction described in the preceding paragraph, in that where gas turbine engine compressor casings, for example, comprise axially consecutive sections bolted together at such conical flange joints, it facilitates machining of the flange rings if one end of each casing section is provided with a flat flange ring and the other end is provided with a conical flange ring. This is because the flat flange ring can be machined first and then its flat joint face can be used as a datum for accurate machining of the more difficult-to-machine conical flange.

Further variations of the invention (not illustrated) can be envisaged which are applicable to feeds or offtakes of pressurised fluid to or from an inlet or outlet aperture in any internally pressurised structure. For example, a conical flange ring can be provided on the end of a pipe or other piece of ducting comprising the feed or offtake, and a joint between the ducting and the wall of the pressurised structure can be formed by providing the latter with either a boss or a stub pipe to define the inlet and outlet aperture, the boss having a planar joint face complementary to the conical joint face on the ducting and the stub pipe having either a thick, stiff flange ring with a planar joint face, producing a joint like that described in relation to FIG. 3, or a less stiff flat or conical flange ring, producing a joint like that discussed in the two preceding paragraphs, or like those in FIG. 2A or 2B.

Because the use of the above-described types of conical flange rings for creating pressure-tight bolted joints in ducting and casings is a radical departure from prior aeroengine engineering practice, a more extensive discussion of the principles of the design of such joints follows.

The following design guidelines are based on testing of joints comprising twin-conical flange rings (as in FIG. 2A) made of 12% chromium steel available from British Steel under the designation Jethete M152, having 457 mm inside diameter, cone angles of 4° and 6°, and bolts and nuts also made of Jethete M152 with the bolts being of 6.35 mm diameter. Flange thickness, T, was either 2.3 mm or 3.2 mm.

ASSEMBLY STRESSES

The stress analysis of a conical flange ring, and the way in which it seals, are very different from prior flat flange ring designs.

Figure 4A:
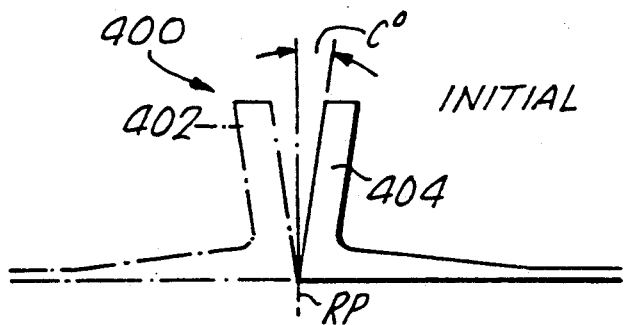
FIGS. 4A-4E shows, in exaggerated form, five stages in the assembly and loading of a bolted joint comprising two flange rings according to the invention.
Figure 4B:
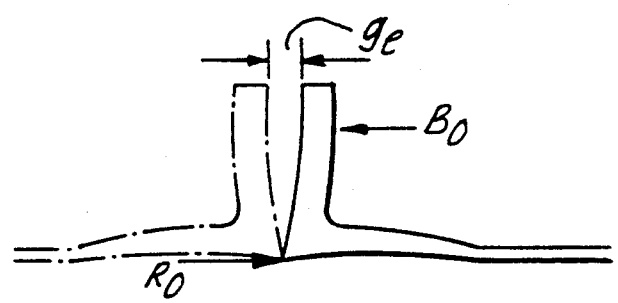

FIGS. 4A to D show in exaggerated form four stages in the assembly and loading of a joint 400 comprising two conical flange rings 402, 404. When the flange pair are initially brought together, FIG. 4A, there is contact at the internal diameter and a large gap at the outside diameter. In FIG. 4B, as the bolt load $B_o$ is applied a mutual reaction force $R_o$ is generated at the internal diameter and the flanges begin to close. Evidently, at this stage, the applied bolt load $B_o$ will be considerably less than the bolt load $B^{CL}$ which will finally cause the joint to close. The closure of the flange will not be axisymmetric; gap $g_e$ will be smaller in-line with the bolts than at mid-pitch. There will be some bending of the bolt, which will initially cause tension on the outside surface of its shank. However, the magnitude (and perhaps the sense) of the bending will change as the point of load transfer moves inboard at higher bolt loads $B_o$.

Whatever the radial location of the bolt load, the reaction force $R_o$ at the internal diameter will be equal to $NB_o$, where N is the number of bolts.

If the flange profile is stiff enough, the rated bolt load $B^R$, i.e. the maximum allowable load on the bolt, taking account of safety factors, etc., will be reached before the flanges have closed upon each other. If however, as we prefer, the profile is sufficiently flexible, the third stage of closure, FIG. 4C, will occur. The closure load, $B^{CL}$, is defined as that bolt load which will just cause the flanges to come into contact at the outside diameter in-line with the bolt.

Figure 4C:
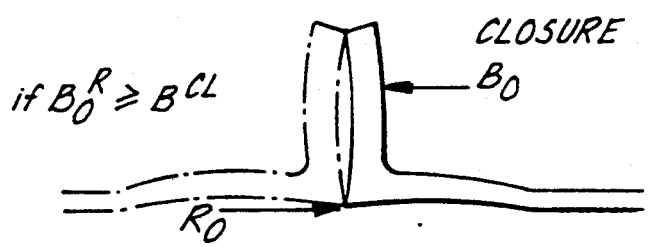
Figure 4D:
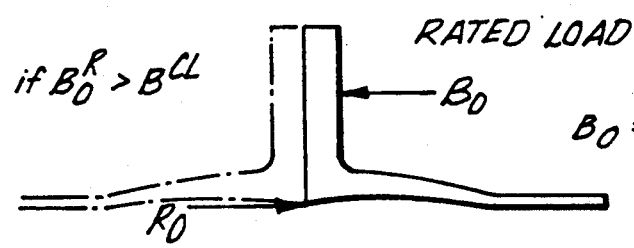

At this stage $R_o = NB^{CL}$, and there may be some curvature of the joint surfaces, as illustrated in FIG. 4C. Finally, bolt load will be increased up to the rated value. This last stage, FIG. 4D, will flatten the joint surfaces against each other, and raise the reaction force $R_o$ to a value somewhat greater than $NB^{CL}$.

Figure 4E:
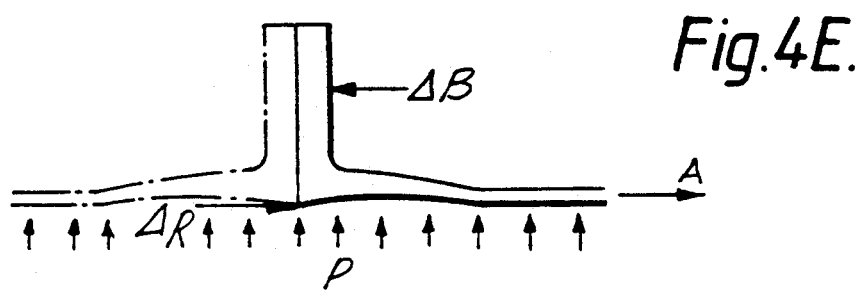

The stresses produced during this procedure, in the flange profile and in the bolt, act as the steady component in the low cycle fatigue loading caused by operational service of the gas turbine engine. The application of the cyclic loads, primarily axial load, A, and internal pressure, P, is illustrated in FIG. 4E. In aero engine design, A is usually tensile, but could be compressive, which would obviously help sealing of the joint against pressure. In the loaded state, the internal diameter reaction force and the bolt load are given by:

$$R = R_o + \Delta R$$

$$B = B_o + \Delta B$$

Where R and B are the changes in reaction force and bolt load due to the cyclic loads.

SEALING EFFICIENCY ($\eta$)

Figure 5A:
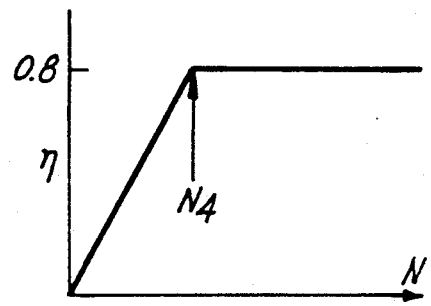
FIGS. 5A and 5B are graphical representations of joint characteristics which vary with the number of bolts utilised.

Sealing efficiency is defined as the ratio of $A/NB_o$ at the onset of hydraulic leakage, when a joint is being tested under hydraulic pressure. For bolt loads below the closure load, $B^{CL}$, sealing efficiency has been found to be 0.8 at small and intermediate bolt spacing, i.e. bolt pitches in the range 3 to 5 centimeters. The reason that it is not 1.0 is the random scatter on individual bolt loads. Sealing efficiency falls at larger bolt spacing, because the bolt load cannot produce a uniform line reaction at the inside diameter (the sealing flat) due to the elasticity of the flange ring. At this point, it may be mentioned that our tests show that sealing efficiency is maintained even after repeated assembly and disassembly. This shows that the quoted sealing efficiencies are not dependent upon plastic deformation of the sealing flats. FIG. 5A shows how the sealing efficiency varies with the number N of equally spaced bolts in a conical flange ring of the type previously described. At large bolt pitches (small number of bolts), the sealing efficiency increases linearly with the number of bolts until number of bolts $N_4$ is reached. At $N_4$ the sealing efficiency reaches the maximum value and thereafter it does not increase.

Table 1 shows how the actual value of $N_4$ for conical flange rings of the diameter tested can be safely extrapolated to similar flanges with different internal diameters, d.

TABLE 1

| | $d \leq 457$ mm | $d \geq 457$ |
|---|---|---|
| $N_4$ | 20 | 20 (d/457) |

MARGINAL SEALING EFFICIENCY ($\eta_{marg}$)

Marginal sealing efficiency is defined as the rate at which axial load at the onset of hydraulic leakage increases with assembly bolt load after the joint has closed. Bolt load applied to flatten the flange rings after the flanges have touched at the outside diameter makes only a small contribution to the axial load A that can be sealed against. Marginal efficiencies have been found to be between 0.1 and 0.3.

MINIMUM LINE REACTION, r(min)

A certain minimum intensity of line reaction $R_o$ must be maintained in order to prevent air (as opposed to hydraulic) leakage. This has been found to be 20 kN/m for 12% Cr steel flanges.

LEAKAGE AT HIGH AXIAL LOADS

Air leakage increases, slowly at first and then sharply, as the axial load A is increased beyond the sealing limit (which we have arbitrarily defined as $A_s$, the axial load at which air leakage reaches 0.01 l/min with volume measured at test pressures of up to 5½ bar. The line axial loading ($A/2\pi R$) can increase by 14 kN/m beyond the sealing limit before the leakage reaches 1 l/min. Beyond this point, leakage flows increase greatly for small increases in axial loading. We thus see that a joint comprising conical flange rings will seal well (i.e. leakage less than 0.01 liters/min) until the line reaction falls to r(min), but that high leakage can occur with relatively small excursions of tensile axial load beyond $A_s$.

BOLT BENDING ON ASSEMBLY

Although the bolt head is initially in contact with the flange at its outermost point only, it has been found that the flange conforms to the bolt head quickly enough for stresses to be kept within elastic limits.

Moreover, a reversal of bolt bending has been shown by all the flanges we have tested shortly before they closed. Bolt bending stresses at full rated torque were similar to those in a joint comprising flat flange rings such as shown in FIG. 1, i.e. small in comparison with the tensile stress.

Three conditions are known to increase the severity of bolt bending during assembly; a small number of bolts, a thicker flange ring, and a larger cone angle. For the flange rings actually tested, no difficulties were encountered in a 4° flange, but a 6° cone angle with large bolt pitching would have produced plastic stresses in the bolts during assembly.

BOLT INTERACTION ON ASSEMBLY

If the bolts are sufficiently close together in a conical flange ring, the application of a load increment to one bolt will reduce the load in the immediately adjacent bolts. This is not important, as long as the discrepancy between nominal torque and effective torque is understood, nominal torque being the torque shown on the torque wrench when the bolts are being tightened, and the effective torque being the torque necessary to attain the bolt loading if the bolts were all equally tight at all moments during assembly.

CYCLIC BOLT STRESSES, $\Delta B$

One of the great advantages of the conical flange ring is the reduction of cyclic bolt stresses to negligible proportions. This is because a change in axial load, $\Delta A$, must produce a change in reaction $\Delta R$ at the internal diameter which overcomes the reaction R before the bolts can feel the $\Delta A$. There is no reason for imposing a limit on the ratio $A/NB_o$ on account of bolt low cycle fatigue considerations alone.

IMPORTANCE OF SUFFICIENT FLANGE STIFFNESS

For a flange which has closed at a bolt load $B^{CL}$, smaller than the rated load $B^R_o$, the axial load that can be sealed against is given by:

$$A_s = \eta \cdot NB^{CL} + \eta_{marg} N(B^R_o - B^{CL}) - 2\pi R r(\text{min}).$$

The first term considerably outweighs the other two (in static structural casings at least). In view of the severe leakage penalties consequent upon exceeding $A_s$, it is vital that a conical flange be designed with sufficient stiffness (i.e. sufficient closure load, $NB^{CL}$).

PREDICTION OF ASSEMBLY STIFFNESS

Figure 5B:
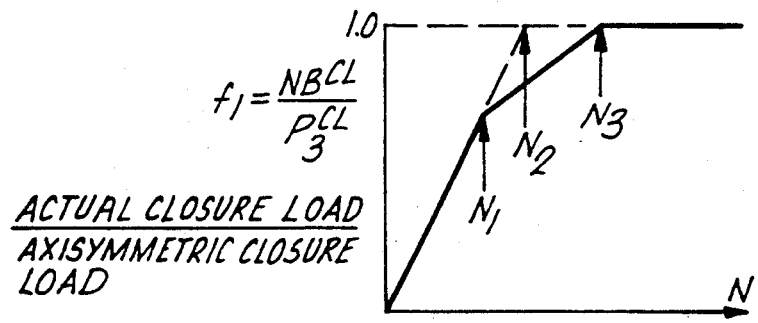

Our research has proved that the assembly stiffness of a flange can be predicted by axisymmetric finite element analysis, which assumes that the total load in all the bolts is applied as a uniform continuous loading along the pitch circle. This assumption is valid for bolt pitches which are small because under such loading conditions the flange ring profiles do in fact deform substantially axisymmetrically. However the stiffnesses of the flange rings fall below the axisymmetric analysis value if the bolt pitches are sufficiently large. This is accounted for by applying the appropriate factors to the axisymmetric analysis, and this is shown in FIG. 5B, which is empirically derived.

The Figure shows how the ratio $f_1$ of the actual total bolt closure load $NB^{CL}$ to the axisymmetric closure load $P_3^{CL}$ varies with the number N of equally spaced bolts in a conical flange ring of the type previously described. At large bolt pitches (small number of bolts), the actual (non-axisymmetric) total joint closure load $NB^{CL}$ increases linearly with the number of bolts until number of bolts $N_1$ is reached. Between $N_1$ and $N_3$ is a transition region where $NB^{CL}$ continues to increase towards the axisymmetric value, but at a diminishing rate because the bolts are now sufficiently close together for neighboring bolts to affect each other's loads.

At $N_3$, the actual total closure load reaches the axisymmetric value and thereafter it does not increase. The value $N_2$ is inserted merely in order to define the slope of the curve at the origin.

Table 2 shows how the actual values of $N_1$, $N_2$ and $N_3$ for conical flange rings of the diameter tested can be safely extrapolated to similar flanges with different internal diameters d.

TABLE 2

|  | d ≦ 457 mm | d ≧ 457 |
| --- | --- | --- |
| $N_1$ | 19 | 19 (d/457) |
| $N_2$ | 24 | 24 (d/457) |
| $N_3$ | 30 | 30 (d/457) |

PREDICTION OF ASSEMBLY STRESSES

Assembly stresses can be predicted by the same axisymmetric finite element analysis with ring loading at the pitch circle. They will be high, and they exist throughout the length of the hub and for some distance into the shell of the casing section. Non-axisymmetric behaviour, which occurs at larger bolt spacing, leads to lower stresses than the axisymmetric predictions, assuming the same flange deflection in both cases.

PREDICTION OF CYCLIC STRESSES

Cyclic stresses can be predicted by axisymmetric finite element analysis. It is found that they are significant in the hub and for some distance into the shell of the casing section, but they are small in the flange fillet $r_f$, where they are much smaller than those in the fillet of a flat flange, a typical value being 100 MPa. However, they are associated with high assembly stresses. Cyclic stress contributions to peak stress will need to be considered in the design of conical joints, but cyclic stresses will usually be too low for there to be any problems with low cycle fatigue.

EFFECT OF SCALLOPS ON ASSEMBLY STIFFNESS

Figure 6:
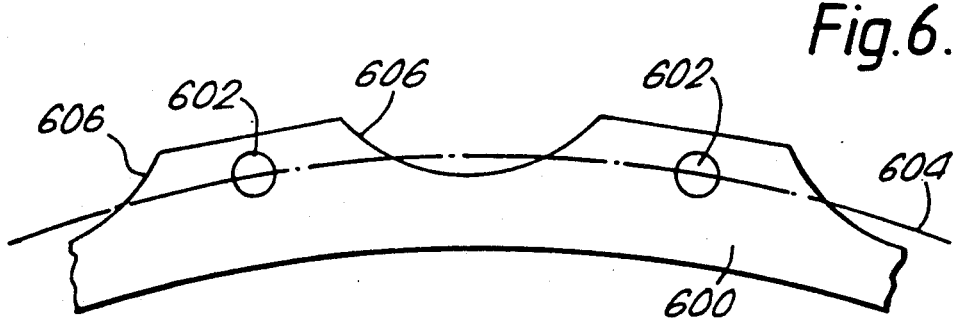
FIG. 6 is an end elevation of part of a flange ring which has been designed to minimise weight.

FIG. 6 shows an end view of a small segment of a flange ring 600 provided with bolt holes 602 on a pitch circle 604. Portions of the ring 600 have been machined away between the bolt holes 602 in order to save weight, thereby creating so-called "scallops" 606 in its rim. In shape, these scallops are conveniently, but not necessarily, segments of circles.

It has been found that the removal of deep scallops 606, cutting inside the pitch circle 604, has little effect on flange stiffness and the axial load A that can be sealed against.

This makes the conical flange ring attractive for joints where weight saving is important.

COMPARISON OF FLAT AND CONICAL FLANGE RING JOINTS

The following Table compares the characteristics of the above two types of non-gasket flanged ring joints.

TABLE 3

| FEATURE | FLAT | CONICAL |
| --- | --- | --- |
| Assembly stress in fillet | none | high |
| Assembly stress at weld | none | high |
| Cyclic stress in fillet | high | low |
| Cyclic stress in weld | small | small |
| Critical stress location | fillet | weld |
| Contact area between joint faces | varies, near bolts only | constant, continous |
| Cyclic bolt stress | high | none |
| Max. $A/NB_o$ | 0.3–0.4 | 0.8 |
| $A/NB_o$ limited by | cyclic bolt stress | sealing |
| Flange leakage below rated load | at all loads | zero |
| Flange leakage at rated load | yes | zero |
| Flange leakage at overload | no increase | high |
| Scalloping | limited by leakage | unlimited |
| Leakage through bolt clearance holes | possible when $A/NB_o > 0.2$ | impossible |

We conclude from the above that near-perfect sealing (hydraulic leakage rates of less than 0.01 liters/min) is attainable only by joints employing conical flange rings. Even if such low leakage rates are not required, but weight considerations require deep scalloping of the flange rings, conical flange ring joints will again be desirable. Furthermore, the invention facilitates dramatic decreases in the number of bolts required to maintain leakage levels below defined levels and maintain cyclic stresses in the bolts below the levels for onset of low cycle fatigue. Even without scalloping, it should be possible to design conical flange rings which are comparable in weight to equivalent flat flange rings.

Figure 7:
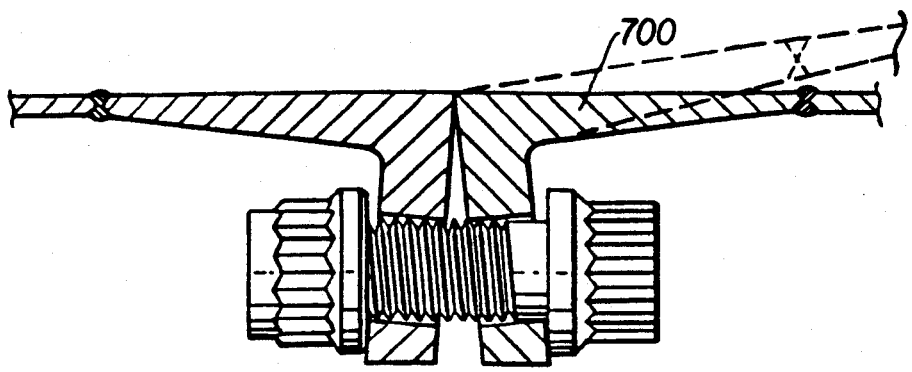
FIG. 7 shows a sectional side elevation of an alternative form of the invention.

Although the above description of the invention has concentrated on casings, pipes and ducts having external joints comprising flange rings which are outwardly projecting, the invention is of course equally applicable to such vessels when provided with internal joints comprising flange rings which are inwardly projecting, as shown in FIG. 7, if for some reason it is desired to maintain a smooth outer surface 700 for the vessel.

The above description also discloses only internal pressurisation of joints. However, joints according to the invention will remain fluid-tight whether the pressurisation is internal to the joint, or external.

A variation of the invention is envisaged, which involves insertion of a spacer between two confronting flanges, at least one of the flanges being a conical flange.

Figure 8:
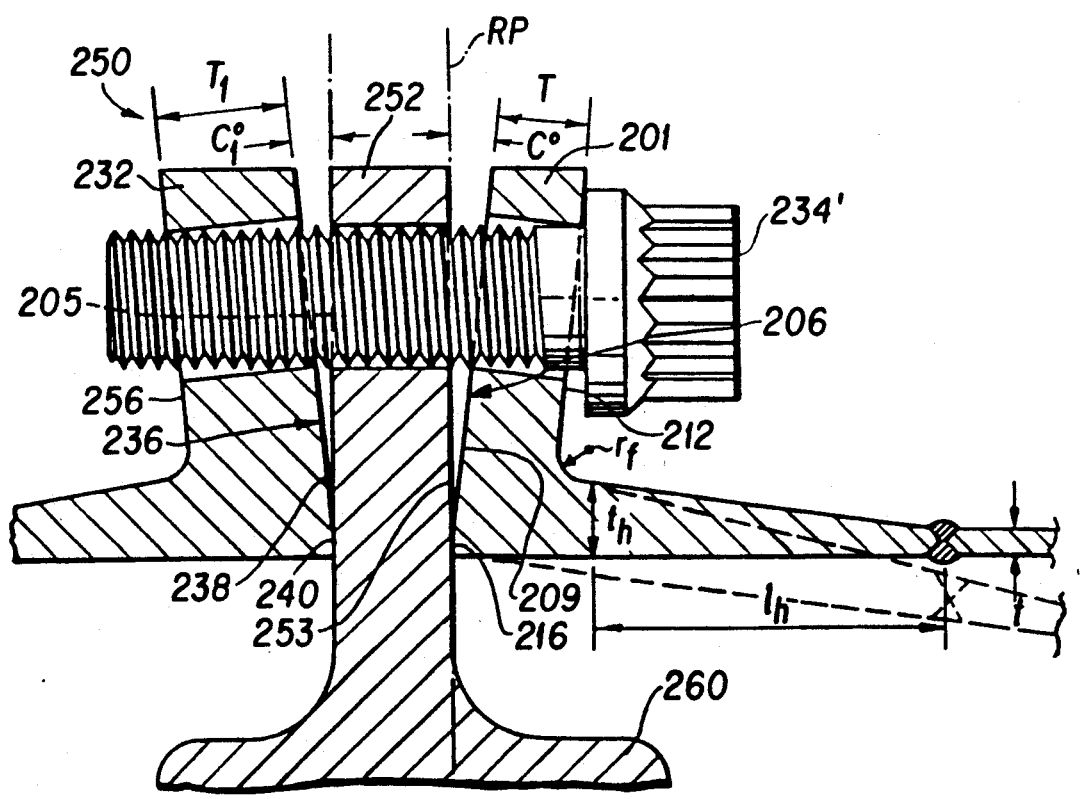
FIG. 8 shows a sectional side elevation of a further alternative form of the invention.

FIG. 8 shows such a flange joint 250 in longitudinal cross-section, the joint comprising a spacer ring 252 and two conical flanges 201,232. The flange rings and their hubs are identical to those shown in FIG. 2B, identical features being indicated by identical reference symbols. The spacer ring 252 supports an inner shroud ring 260 which surrounds a bladed rotor (not shown) in a gas turbine engine.

Incorporation of a spacer ring 252 into the joint 250 changes the way in which the joint closes under bolt load, even though in the unstressed condition the conical flanges are identical to those in FIG. 2B. This is due to the inherent stiffness of the spacer ring 252, which is here assumed to be made of the same material as the adjacent flange rings. As the bolts 234' with their nuts (not shown) are tightened, the flats 216,240 at the radially inner diameter of the joint faces 206,236 come into contact with the plane radially oriented complementary joint faces 253,254 which form the sides of spacer 252. Then the cone angles c°, $c_1°$ are gradually closed up until the frustoconical surfaces 209,238 of the joint faces 206,236 also contact the complementary joint faces 253,254 of the spacer 252.

With the bolts 234' and the nuts tightened until their undersides lie flat against the back surfaces 212,256 of the flange rings, the spacer 252 will be distorted away from its initial radial orientation by a certain amount towards the flange ring 232, which is considerably stiffer than flange ring 201. However, the amount of distortion will be small if the spacer is thick as shown, and therefore stiff. In FIG. 2B the less stiff flange 201 moves through a total angle of a° as the bolts are tightened, and the stiffer flange 232 moves through a total of $a_1°$, but in FIG. 8 the corresponding angular movement of flange 201 will be smaller (i.e. slightly more than c°), while that of flange 232 will be larger (i.e. slightly less than $c_1$).

It will be understood that a joint comprising a flat flange and a conical flange could equally well incorporate a spacer, as indeed could any of the other joints within the scope of the invention.

Although only bolts have so far been mentioned as being capable of securing flange rings together for the purpose of making a fluid-tight joint, alternative types of fasteners such as rivets or clamps may be suitable for use in certain fields outside the civil aero engine industry.

It would also be within the scope of the invention to utilise hub portions having non-cylindrical bores. For instance, in aero engine design, the bores of some casings are of a frustoconical form, and the hub bores would also be frustoconical to match. Thus, in FIGS. 2, 3, and 8, as shown by the dashed lines in FIG. 8, the bores 214 and 310 could depart from cylindricality by being given a cone angle of up to 10° without having any substantial effect on the other design parameters of the joints. Similarly, the inwardly projecting conical flange shown in FIG. 7 can have a frustoconical external hub surface, as shown by the dashed lines.

It will be evident to the average specialist that although the above description has concentrated on joints comprising conical flange rings which are drawn fully closed at their outside diameters by the nuts and bolts, it would be possible, within the ambit of the invention, to operate such joints in the partially closed condition, and joints could be specifically designed for such operation. However, we prefer to operate fully closed joints in order to avoid large bending stresses in the bolts in the assembled condition.

We claim:

1. A metallic flange ring for a fluid-tight metal-to-metal annular joint between axially consecutive component parts of a hollow fabrication, the flange ring having:
    (a) a flange joint face;
    (b) a flange rear face;
    (c) a hub portion for joining the flange ring to one of the component parts of the fabrication, the hub portion having a wall thickness which reduces from a maximum portion adjacent the flange rear face to a minimum which is substantially equal to a wall thickness of the component part; and
    (d) a plurality of angularly spaced-apart location features for the location of fastening means whereby the flange joint face can be drawn into sealing engagement with a confronting complementary joint face to form the fluid-tight annular joint;

wherein the flange joint face in an as-manufactured unstressed condition has a radially disposed sealing flat which constitutes a portion of said joint face, a remainder of the flange joint face comprising a frustoconical surface inclined at an angle of c° to the radial direction and meeting the sealing flat at a corner with an included angle of 180°-c° where c° has a value of greater than 0° up to about 8°, the width and position of the sealing flat on the flange joint being such that manufacturing tolerances of the fabrication do not prevent sealing engagement with the complementary joint face, the flange rear face being parallel to the frustoconical surface, the stiffness of the flange ring being such as to allow at least the sealing flat to be drawn into contact with the complementary joint face by the fastening means with a force sufficient to generate a line reaction at the sealing flat sufficient to seal against a predetermined fluid pressure without overstraining the fastening means.

2. A flange ring according to claim 1 in which the stiffness of the flange ring is such as to allow the frustoconical surface of the flange joint face to be drawn into contact with the complementary joint face without overstraining the fastening means.

3. A flange ring according to claim 1 the width of the sealing flat being at least partly coextensive with the wall thickness of the hub portion.

4. A flange ring according to claim 3 in which the width of the sealing flat is no greater than about three quarters of the minimum wall thickness of the hub portion.

5. A flange ring according to claim 3 in which the width of the sealing flat is approximately one-half of the minimum wall thickness of the hub portion.

6. A flange ring according to claim 1 the flange ring being outwardly projecting.

7. A flange ring according to claim 6, in which the sealing flat is at the radially inner circumference of the flange joint face.

8. A flange ring according to claim 6 in which the hub portion has a substantially cylindrical bore.

9. A flange ring according to claim 6 in which the hub portion has frustoconical bore.

10. A flange ring according to claim 1 the flange ring being inwardly projecting.

11. A flange ring according to claim 10, in which the sealing flat is at the radially outer circumference of the flange joint face.

12. A flange ring according to claim 10 in which the hub portion has a substantially cylindrical external surface.

13. A flange ring according to claim 10 in which the hub portion has a frustoconical external surface.

14. A flange ring according to claim 1 in which the fastening means comprise bolt means and the angularly spaced-apart location features are clearance holes for the bolts.

15. A flange ring according to claim 1 in which the wall thickness of the hub portion reduces from the maximum to the minimum thickness without any stepwise transitions.

16. A flange ring according to claim 15 in which the wall thickness of the hub portion reduces from the maximum to the minimum thickness as a straight line taper.

17. A flange ring according to claim 15 in which the wall thickness of the hub portion reduces from the maximum to the minimum thickness as a shallow concave taper.

18. A flange ring according to claim 1 in which angle $c°$ is in the range of about 1° to 6° inclusive.

19. An annular joint for joining axially consecutive component parts of a hollow fabrication, the joint comprising two confronting joint faces, at least one of the joint faces belonging to a flange ring in accordance with claim 1.

20. An annular joint for joining axially consecutive component parts of a hollow fabrication, the joint comprising two pairs of confronting joint faces, one joint face out of each pair of confronting joint faces belonging to spacer ring means and at least one of the remaining joint faces belonging to a flange ring in accordance with claim 1.

21. A component section of a structural casing for a turbomachine, at least one end of the component section being provided with a flange ring in accordance with claim 1 for bolting to a confronting complementary feature of a further component of the casing.

22. A component section of a structural casing for a turbomachine, both ends of the component section being provided with a flange ring for bolting to confronting complementary features of further components of the casing, one of the flange rings being in accordance with claim 1, the other flange ring having a joint face which in an as-machined unstressed condition lies in a radial plane of the component section.

* * * * *